(12) United States Patent
Oku et al.

(10) Patent No.: US 7,252,262 B2
(45) Date of Patent: Aug. 7, 2007

(54) PROTECTIVE COVER FOR OPTICAL FIBER

(75) Inventors: Masato Oku, Tokyo (JP); Yoshiyuki Sakata, Tokyo (JP); Takashi Suzuki, Tokyo (JP); Toshiaki Tateishi, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 11/443,120

(22) Filed: May 31, 2006

(65) Prior Publication Data

US 2006/0273218 A1    Dec. 7, 2006

(30) Foreign Application Priority Data

Jun. 1, 2005    (JP)    ............................. 2005-161542

(51) Int. Cl.
*B65H 75/18*    (2006.01)
(52) U.S. Cl. .................................................. 242/601
(58) Field of Classification Search ............... 242/601, 242/905, 588, 348, 384.4; 206/397, 398, 206/399, 400, 401, 402
See application file for complete search history.

(56) References Cited

U.S. PATENT DOCUMENTS 1,808,018 A * 6/1931 Charles ....................... 206/401
2,452,378 A * 10/1948 Hudson
4,635,789 A * 1/1987 Webb
5,251,839 A * 10/1993 Zander et al. ............... 242/348
5,482,223 A * 1/1996 Bresina et al. ........... 242/348.4

FOREIGN PATENT DOCUMENTS

JP    2001-2323    1/2001

OTHER PUBLICATIONS

"ABS Rib-Flanged Shiping Spool And K-Resin® Spool Cover", Corning Optical Fiber Application Note AN04 issued in Apr. 1991, pp. 1-4.

* cited by examiner

*Primary Examiner*—William A. Rivera
(74) *Attorney, Agent, or Firm*—Oblon, Spivak, McClelland, Maier & Neustadt, P.C.

(57) ABSTRACT

A protective cover is detachably fixed onto a spool to protect an optical fiber wound on the spool. The protective cover includes a pair of half-cylindrical cover members coupled together by a hinge and locked together by a locking mechanism. When an external force allows a pair of hinge members of the hinge to abut together, edges of the cover members are apart from each other at an angle of 2 to 7 degrees as viewed with respect to the center of the hinge. The edges of the cover members are then abut together by an additional external force to lock the locking mechanism.

9 Claims, 4 Drawing Sheets

PROTECTIVE COVER FOR OPTICAL FIBER

BACKGROUND OF THE INVENTION (a) Field of the Invention

The present invention relates to a protective reel cover for an optical fiber and, more particularly, to the structure of a protective reel cover detachably fixed onto a spool for winding thereon an optical fiber to protect the optical fiber in association with the spool.

(b) Description of the Related Art

An optical fiber is generally wound on a spool after the manufacture thereof, and protected against an external force by the spool and an associated cylindrical protective cover detachably fixed onto the spool. The protective cover generally includes a pair of half-cylindrical cover members, which are coupled together at one of edges of the cylindrical surfaces by a hinge and also fixed together by the locking mechanisms at the other of the edges, thereby forming a cylindrical shape. A technique using the locking mechanism in a protective cover is described, for example, in a literature entitled "ABS Rib-Flanged Shipping Spool And K-Resin Spool Cover", Corning Application Note AN04 issued in April, 1991.

FIG. 8 shows a portion of a protective cover having a locking mechanism similar to the locking mechanism described in the above literature. The protective cover 30 includes a pair of locking mechanisms, which are disposed at opposing edges of the cylindrical protective cover 30 and aligned in the axial direction thereof. The locking mechanisms each include a receiving member 32 fixed onto one of cover members 30A and 30B, and an engagement member 33 fixed onto the other of the cover members 30A and 30B. The engagement member 33 has thereon a locking protrusion 34 at the tip thereof for engaging with the receiving member 32 after insertion of the tip portion of the engagement member 33 into the receiving member 32.

For locking together both the cover members 30A and 30B, an operator allows both opposing edges of the cover members 30A and 30B to come close to each other, while allowing the engagement member 33 to be slightly deflected toward a fixing surface of a handle 35 for the protective cover 30. After the locking protrusion 34 of the engagement member 33 is allowed to pass through the receiving member 32 by the operator, the rear end of the locking protrusion 34 engages with the far edge of the receiving member 32 due to an elastic function of the engagement member 33, thereby locking together both the cover members 30A and 30B.

For releasing the locking mechanisms of the protective cover 30, it is necessary for the operator to press the locking protrusion 34 of the engagement member 33 of one of the locking mechanisms by using a left hand, for example, to press the locking protrusion 34 of the engagement member 33 of the other of the locking mechanisms by a right hand, and also to pull the opposing edges away from each other. Use of both the hands is sometimes difficult to the operator handling the optical fiber. That is, there is a request for handing the protective cover by one hand in the release operation for the locking mechanisms.

Patent Publication JP-2001-2323A describes a protective cover having a locking mechanisms capable of being released with ease. FIG. 9 illustrates the locking mechanisms of the protective cover described in the patent publication. The locking mechanisms each have a receiving member 42 and a hook member 43. The hook member 43 is configured by a leaf spring having a shape of U-character, and has a locking protrusion 44 at the tip thereof.

For locking together both the cover members 40A and 40B, it is sufficient for an operator to only allow the opposing edges of both the cover members 30A and 30B to come in contact with each other, with the other opposing edges being fixed by a hinge not shown. The hook member 43 is inserted into the receiving member 42 to allow the locking protrusion 44 to pass through the receiving member 42, whereby the locking protrusion 44 of the hook member 43 engages with the receiving member 42 to thereby lock together both the cover members 40A and 40B.

In the protective cover 40 described in the patent publication, it is easy for the operator to release the locking mechanisms, and thus the protective cover 40 is superior in the handling capability of the locking mechanisms. However, the hook member 43 protrudes from the surface of the handle 45 with a relatively large dimension. This may cause an inadvertent touch of the hook member 43 by an operator to result in release of the hook member 43 from the receiving member 42. If the hook member 43 has a relatively large elastic force to avoid such a situation, the handling capability will be degraded.

SUMMARY OF THE INVENTION

In view of the above problems in the conventional techniques, it is an object of the present invention to provide a protective cover for an optical fiber, which allows an operator to release the locking mechanism with ease, can reduce the protruding distance of the engagement member, and thus prevents an inadvertent touch of the engagement member from resulting in release of the locking mechanism.

It is another object of the present invention to provide a protective cover including a locking mechanism having a structure which is especially capable of being released with ease.

It is another object of the present invention to provide a protective cover which is capable of being stored together with the fiber-wound spool in a compact dimension and with a stable posture.

The present invention provides, in a first aspect thereof, a protective cover detachably fixed onto a spool, on which an optical fiber is wound, to protect the optical fiber in association with the spool, the protective cover including: a pair of cover members each having a half-cylindrical surface and coupled together by a hinge at one edges of the half-cylindrical surfaces of both the cover members; and a locking mechanism for releasably locking together both the cover members at the other edges of the half-cylindrical surfaces of both the cover members, the locking mechanism including a receiving member fixed onto a vicinity of the other edge of the half-cylindrical surface of one of the cover members, and an engagement member fixed onto a vicinity of the other edge of the half-cylindrical surface of the other of the cover members and capable of being inserted in or released from the receiving member, wherein the engagement member is configured as an elastic stripe body, which has a fixed end fixed onto a fixing surface of the other of the cover members, a free end extending from the fixed end and having thereon an locking protrusion capable of being engaged with the receiving member after insertion of the free end into the receiving member, and a pressing section formed in a vicinity of said fixed end, the pressing section releasing engagement of the free end from the receiving member when the pressing section is pressed toward the fixing surface against elasticity of the elastic stripe body.

The present invention also provides, in a second aspect thereof, a protective cover detachably fixed onto a spool, on which an optical fiber is wound, to protect the optical fiber in association with the spool, the protective cover including: first and second cover members each having a half-cylindrical surface and coupled together by a hinge at one edges of the half-cylindrical surfaces of both the first and second cover members; and a locking mechanism for releasably locking together both the first and second cover members at the other edges of the half-cylindrical surfaces of both the first and second cover members, the locking mechanism including a receiving member fixed onto a fixing surface of the first cover member and an engagement member fixed onto a fixing surface of the second cover member and capable of being inserted in or released from the receiving member, wherein:

when the other edges of the first and second cover members are abut together by an external force to lock the locking mechanism, surfaces of the hinge abut each other before surfaces of the first and second cover members abut each other, and when the surfaces of the hinge abut each other, the other edges of the half-cylindrical surfaces of the first and second cover members are apart from each other at an angle of 2 to 7 degrees therebetween as measured from a center of the hinge.

The present invention also provides, in a third aspect thereof, a protective cover detachably fixed onto a spool, on which an optical fiber is wound, to protect the optical fiber in association with the spool, the protective cover including: first and second cover members each having a half-cylindrical surface and coupled together by a hinge at one edges of the half-cylindrical surfaces of both the first and second cover members; and a locking mechanism for releasably locking together both the first and second cover members at the other edges of the half-cylindrical surfaces of the first and second cover members, the locking mechanism including a receiving member fixed onto a vicinity of the other edge of the half-cylindrical surface of the first cover member and an engagement member fixed onto a vicinity of the other edge of the half-cylindrical surface of the second cover member and capable of being inserted in or released from the receiving member, wherein: each of the first and second cover members includes first and second legs in pair on the half-cylindrical surface thereof; and a first plane defined by tops of the first and second legs formed on one of the first and second cover members is perpendicular to a second plane defined by tops of the first and second legs formed on the other of the first and second cover members, after the first and second cover members are coupled together by the locking mechanism.

The above and other objects, features and advantages of the present invention will be more apparent from the following description, referring to the accompanying drawings.

PREFERRED EMBODIMENT OF THE INVENTION

Figure 1:
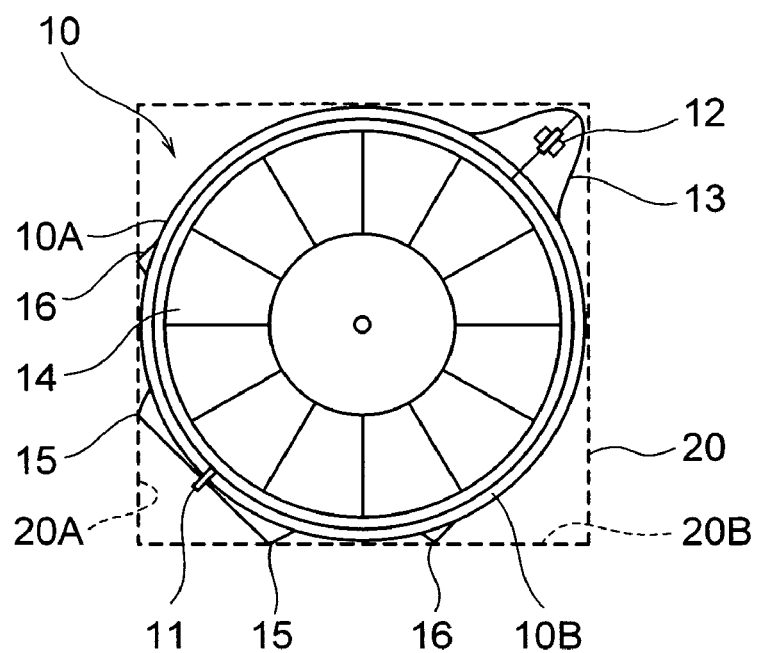
FIG. 1 is a side view of a protective cover according to an embodiment of the present invention, as viewed along the is axial direction of the cylindrical protective cover.

Now, the present invention is more specifically described with reference to accompanying drawings, wherein similar constituent elements are designated by similar reference numerals.

FIG. 1 is a side view of a protective cover according to an embodiment of the present invention, shown together with an associated spool in the axial direction of the cylindrical protective cover. The protective cover 10 is shown as received in a container 20 illustrated by a phantom line. The container 20 is of a cuboid having a square sectional shape, as shown in FIG. 1, and a thickness slightly larger than the length of the cylindrical protective cover 10 in the axial direction. The protective cover 10 includes a pair of half-cylindrical cover members 10A and 10B, which are coupled together by a hinge 11 and a handle 13 including a locking mechanism 12 to provide a cylindrical shape for the protective cover 10. The protective cover 10 covers the periphery of a cylindrical spool 14 on which an optical fiber is wound.

The hinge 11 and the handle 13, which couple together the cover members 10A and 10B, are received in the container 20 near the opposing apexes of the square as viewed in the axial direction of the protective cover 10. The half-cylindrical surface of each of the cover members 10A and 10B has a pair of "legs" 15 and 16 in the vicinity of the hinge 11. The legs 15 and 16 includes a pair of point-like protrusions apart from each other in the axial direction of the cylindrical protective cover 10 or extends in the axial direction of the cylindrical protective cover 10.

The legs 15 and 16 of the cover member 10A are in contact with a first surface 20A of the container 20 to allow a linear portion of the cylindrical surface between the legs 15 and 16 to be in contact with the first surface 20A at the center thereof. The legs 15 and 16 of the cover member 10B are in contact with an adjacent second surface 20B of the container 20 to allow a linear portion of the cylindrical surface between the legs 15 and 16 to be in contact with the second surface 20B at the center thereof.

The portion of the half-cylindrical surface in contact with the surface 20A or 20B of the container 20 is located at equal distances from both the legs 15 and 16. Other portions of the cylindrical surface without a leg are also in contact with third and fourth surfaces of the container 20 at the center thereof. This configuration provides compact dimensions for the container 20, and in addition, if the containers 20 are stacked one on another, the gravity applied to the stacked containers 20 can be alleviated to reduces deformation of the stacked containers.

The spool 14 has a diameter of 266 mm, for example, and the cylindrical surface of the protective cover 10 has an outer diameter of 27.05 mm, for example. Thus, the container 20 receiving therein the protective cover 10 has a minimum inner side of 270.5 mm in the square section. The leg 15 of the cover members 10A and 10B located near the hinge 11 is located so as to allow an easy handling for the protective cover 10, as will be detailed later. The leg 16 of the cover members 10A and 10B located far from the hinge 11 is positioned so as to provide a most stable posture for the protective cover 10 in association with the leg 15 in pair, when the protective cover 10 is placed on a table, for example.

Both the legs 15 and 16 have a suitable height and a suitable positional relationship therebetween, which are designed so that both the legs 15 and 16 as well as the portion of the cylindrical surface located at equal distances from the legs 15 and 16 are in contact with the surface of a table, if the protective cover 10 is placed on the table.

In a design of one embodiment, the leg 15 near the hinge 11 is located at an angular position of 25.7 degrees away from the hinge 11 as viewed from the central axis of the protective cover 10, the leg 16 far from the hinge 11 is located at an angular position of 64.5 degrees away from the hinge 11, and both the legs 15 and 16 are 8 mm high as viewed from the cylindrical surface.

Figure 2:
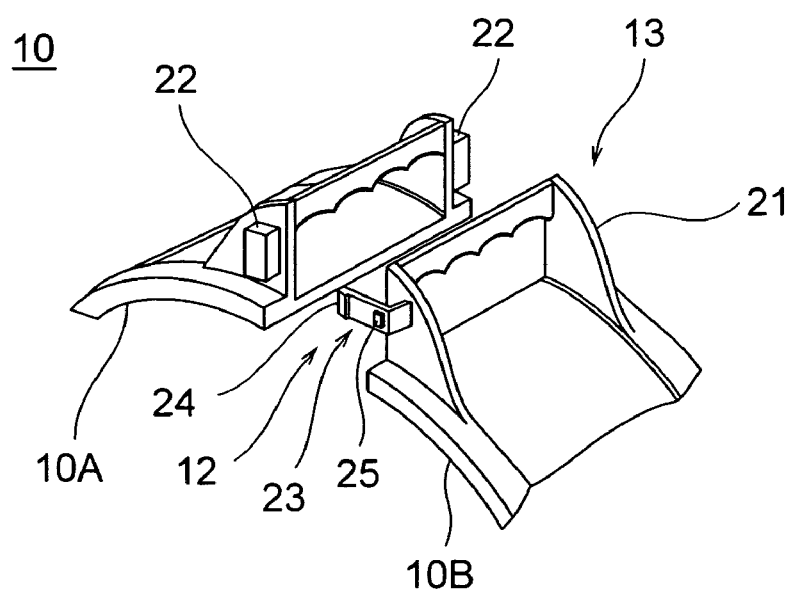
FIG. 2 is a perspective view of a portion of the half-cylindrical cover members in the vicinity of the handle of the protective cover.

FIG. 2 shows in a perspective view the detail of the vicinity of the handle 13 in the protective cover 10 shown in FIG. 1. The handle 13 includes a pair of handle members 21 each attached onto a corresponding one of the cover members 10A and 10B, and mounts thereon a pair of locking mechanisms fixed onto the handle members 21. The handle members 21 have a shape of "C" as viewed from radially outside of the protective cover 10, wherein the handle members 21 have a central plate and a pair of side plates extending from the central plate. The side plates are substantially of a triangle as viewed in the axial direction of the protective cover 10, the triangle having a small-width distal end as viewed from the boundary between the cover members 10A and 10B.

Moreover a maximum width between outside surfaces of both the engagement members is not more than a width of the cylindrical protective cover as viewed in a axial direction of the cylindrical protective cover.

Each of the locking mechanisms 12 has a receiving member 22 fixed onto the handle member 21 of the cover member 10A, and an engagement member 23 fixed onto the handle member 21 of the cover member 10B. The receiving member 22 is configured from a stripe sheet to form a rectangular cylindrical shape having an opening for receiving therein the engagement member 23. The engagement member 23 has a body portion configured as a stripe sheet having elasticity. The elastic body portion has a fixed end, which is bent at an angle of 90 degrees from the body portion and fixed onto the handle member 21, and a free end having thereon a locking protrusion 24, which has a small-thickness front tip. The body portion also mounts thereon a pressing piece 25 adjacent to the fixed end for receiving a pressing force from an operator.

Figure 3A:
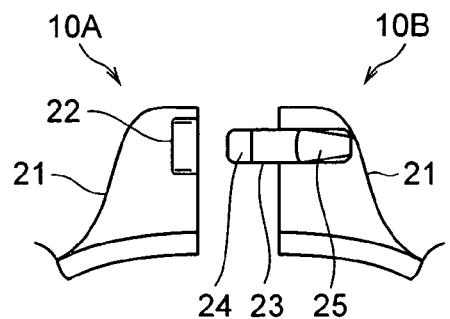
FIG. 3A is a side view of the portion of FIG. 2 in a released state of the locking mechanism.
Figure 3B:
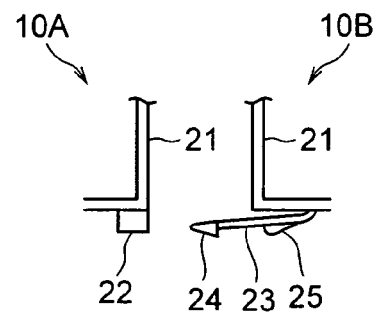
FIG. 3B is a top plan view of the portion of FIG. 2 in the released state of the locking mechanism.
Figure 3C:
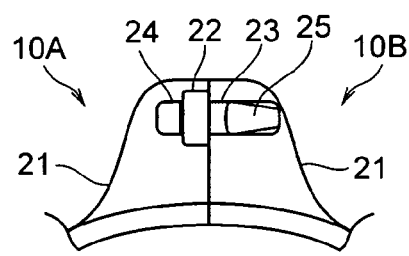
FIG. 3C is a side view of the portion of FIG. 2 in a locked state of the locking mechanism.
Figure 3D:
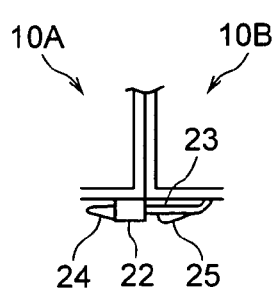
FIG. 3D is a top plan view of the portion of FIG. 2 in the locked state of the locking mechanism.

FIGS. 3A to 3D show the different situations of the locking mechanisms shown in FIG. 2, wherein FIG. 3A is a side view of the locking mechanism before locking, as viewed in the axial direction of the protective cover 10, FIG. 3B is a top plan view thereof before the locking, as viewed from radially outside of the protective cover 10, FIG. 3C is a side view after the locking, and FIG. 3D is a top plan view after the locking.

Before the locking, the body portion of the engagement member 23 extends toward the receiving member 22, and stay away from the fixing surface of the handle member 21 at a larger distance in the vicinity of the free end than in the vicinity of the fixed end. After both the receiving member 22 and the engagement member 23 are allowed to approach and come in contact with each other, the tip of the locking protrusion 24 fixed onto the free end of the body portion of the engagement member 23 is received in the opening of the receiving member 22, and the receiving member presses the tip of the engagement member 23 toward the fixing surface of the handle member 21 against the elasticity of the engagement member 23, whereby the engagement member 23 is received in the opening of the receiving member as the engagement member advances with respect to the receiving member 22.

After the insertion is completed by the receiving member 22, the body portion of the engagement member 23 extends parallel to the fixing surface of the handle member 21. The protrusion 24 on the tip of the body portion of the engagement member 23 passed by the opening of the receiving member 22 engages with the receiving member 22 at the thick rear end of the locking protrusion 24, to thereby lock the engagement member 23 with the receiving member 22. Thus, both the cover members 10A and 10B are locked together and fixed firmly.

For releasing the protective cover 10 from the spool, both the pressing pieces 25 of the engagement members 23 are pressed toward the respective fixing surfaces of the handle member 21 by an operator using fingers of one hand, whereby the locking of the locking protrusion 24 of the engagement member 23 with respect to the receiving member 22 is released. In the present embodiment, since both the pressing pieces 25 are aligned in the axial direction of the protective cover 10, the pressing pieces 25 can be handled by one hand at a time.

The mere pressing of the pressing pieces 25 releases the engagement of the locking protrusion 24 with the receiving member 22, and allows the abutting edges of both the cover members 10A and 10B to turn around the hinge 11 away from each other due to the own elastic force of the cover members 10A and 10B and gravity, resulting in pullout of the engagement member 23 from the receiving member 22. Thus, the release of the protective cover 10 from the spool can be achieved using one hand, thereby improving the handling capability of the protective cover 10.

Figure 4:
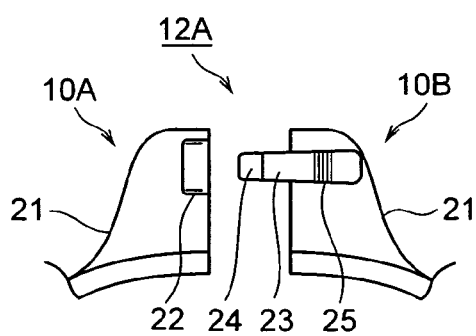
FIG. 4 is a side view of the portion corresponding to the portion of FIG. 2 in a modification of the embodiment.

FIG. 4 is a side view of a modification of the locking mechanism modified from the above embodiment. The locking mechanism 12A includes a engagement member 23 having a notch 26 instead of the pressing piece 25 in the above embodiment. The notch 26 improves the friction of the finger with respect to the surface of the engagement member 23 during pressing of pressing section of the engagement member 23. That is, the notch 26 has a function similar to the function of the pressing piece 25, and has a simpler structure than the pressing piece 25.

Figure 5A:
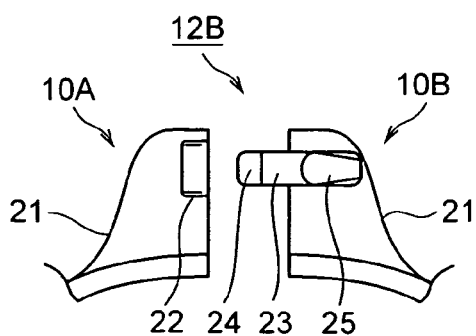
FIG. 5A is a side view of the portion corresponding to the portion of FIG. 2 in another modification of the embodiment.
Figure 5B:
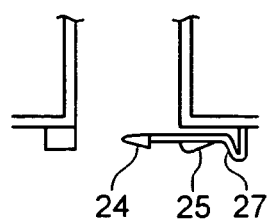
FIG. 5B is a top plan view thereof.

FIGS. 5A and 5B show another modification of the locking mechanism in a side view and a top plan view, respectively. This modification is such that the engagement member 23 has a bend 27 to have a larger protruding distance with respect to the fixing surface of the handle member 21 in the vicinity of the fixed end compared to the outer surface of the pressing piece 25, as shown in FIG. 5B. The presence of the bend 27 reduces the pressing force for the elastic body portion of the engagement member 23 upon release of the engagement of the engagement member 23 with the receiving member 22.

Figure 6:
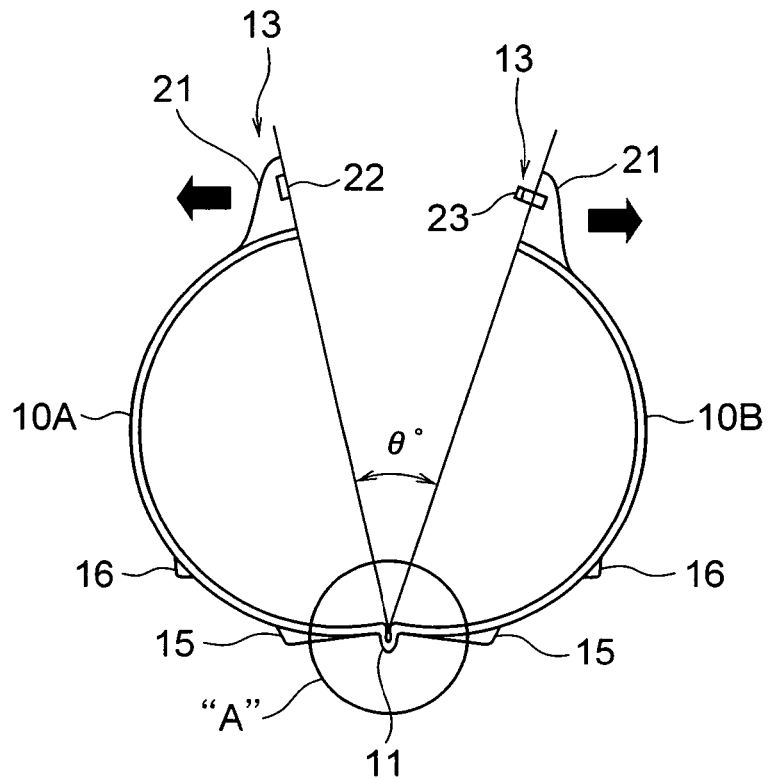
FIG. 6 is a side view of the protective cover of the embodiment in a state immediately after the locking mechanism is released.

FIG. 6 shows the structural relationship between the locking mechanism of the protective cover and the hinge, legs thereof. As described before, the cover members 10A and 10B each have a pair of legs 15 and 16 in the vicinity of the hinge 11, the legs 15 and 16 each including a pair of point-like protrusions. In an alternative, the legs 15 and 16 each may be a linear protrusion extending along the axial direction of the cylindrical protective cover 10. For coupling together both the cover members 10A and 10B at the handle members 21, the central plates of the C-shaped handle members 21 extending in the axial direction of the cylindrical protective cover 10 are allowed to come close each other and coupled together by an operator using one hand.

The protective cover 10 is designed so that the surfaces of the hinge 11 are first abut each other, before the front surfaces the central plates of both the handle members 21 of the cover members 10A and 10B abut together. This first abutment of the hinge surfaces is designed to occur at an angle ($\theta$) of 2 to 7 degrees between the opposing edges of both the cover members 10A and 10B in the vicinity of the handle members 21, as viewed from the center of the hinge 11.

If the angle $\theta$ is smaller than 2 degrees, an external force must be applied for turning or rotating the cover members upon release of the protective cover 10. On the other hand, if the angle $\theta$ is larger than 7 degrees, it is difficult to handle the cover members by one hand because both the opposing edges of the cover members 10A and 10B are located too far from each other to handle the cover members 10A and 10B by one hand.

In one embodiment, an angle of 5 degrees for $\theta$ between the abutting surfaces of the handle members 21, as viewed from the center of the hinge 11, is obtained by controlling the hinge shape.

Upon coupling, the handle members 21 of both the cover members 10A and 10B are applied with a slight rotational force toward each other at the angular position at which the surfaces of hinge 11 abut each other. This allows the engagement member 23 to be received in the opening of the receiving member 22 and locked thereto.

Upon release of the protective cover 10 from the spool, the engagement of the engagement member 23 with the receiving member 22 is released by pressing the pressing protrusion without applying an external rotating force, whereby both the cover members 10A and 10B are released from one another due to the elastic force (first elastic force) of the cover members 10A and 10B generated at the hinge 11. The release of both the cover members by the elastic force near the hinge 11 provides a further release of both the cover members from one another due to the elastic force (second elastic force) of the cover members 10A and 10B and the gravity.

Figure 7A:
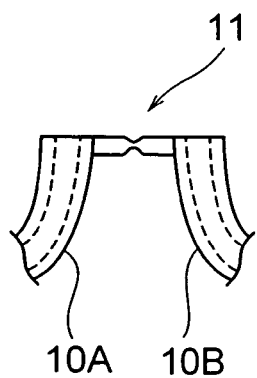
FIGS. 7A and 7B are side views of the hinge in an open state and a closed state, respectively, of the hinge.
Figure 7B:
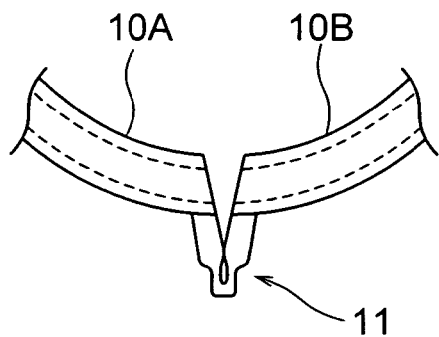
Figure 8:
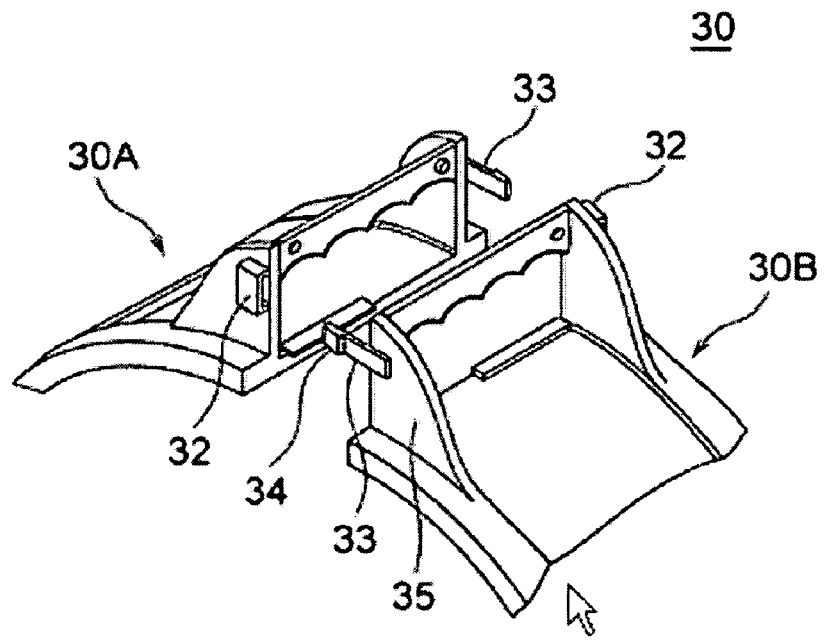
FIG. 8 is a perspective view of a portion of a conventional protective cover in the vicinity of the locking mechanism.
Figure 9:
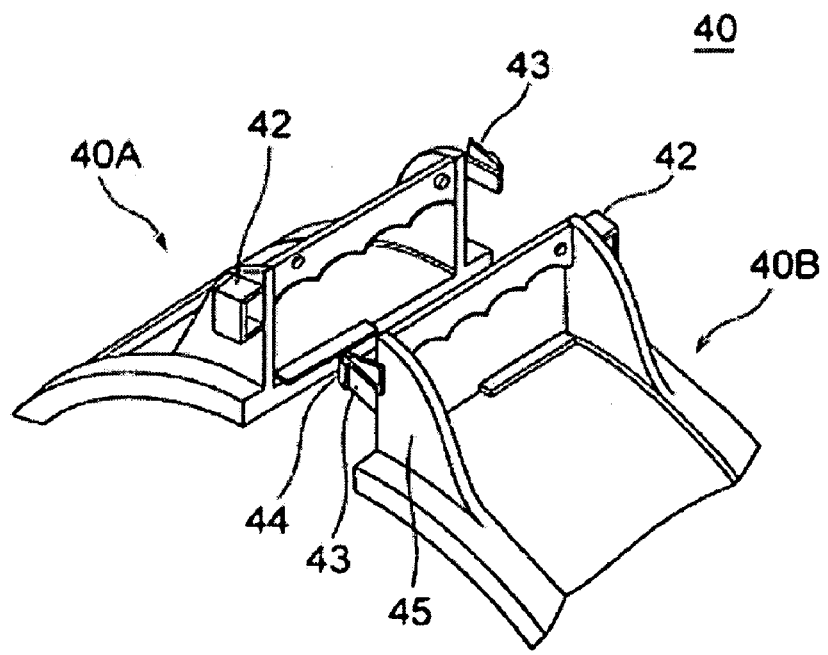
FIG. 9 is a perspective view of a portion of another conventional protective cover in the vicinity of the locking mechanism.

FIGS. 7A and 7B show the vicinity of the hinge 11 encircled by "A" in FIG. 6, wherein FIG. 7A shows a full open state of the hinge 11, and FIG. 7B shows a closed state of the hinge 11. As will be understood from FIG. 6, the hinge 11 is located radially outside the cylindrical external surface of the cover members 10A and 10B. The dimension of the legs 15 is designed so that the hinge 11 is first in contact with a table, if the closed protective cover 10 is placed on the table with the handle members 21 being directed upward. In addition, as shown in FIG. 7B, when the protective cover 10 is being closed, the surfaces of the hinge 11 first abut each other, before the edge surfaces of the cover members 10A and 10B in the vicinity of the hinge 11 abut each other. This provides the first elastic force upon releasing both the cover members 10A and 10B from each other.

The above configuration of the protective cover 10 provides a stable posture of the protective cover due to the pair of legs 15 and 16, upon placing on a table the protective cover 10 loaded with the spool. The above configuration further provides easy opening of the protective cover upon releasing the protective cover, wherein the protective cover is turned to some extent by an operator and the hinge is directed downward, before releasing the locking mechanism. The protective cover of the present embodiment is especially superior in the handling capability with one hand.

Since the above embodiments are described only for examples, the present invention is not limited to the above embodiments and various modifications or alterations can be easily made therefrom by those skilled in the art without departing from the scope of the present invention.

In accordance with the protective cover of the first aspect of the present invention, the pressing section formed in the vicinity of the fixed end of the elastic stripe body provides a smaller protruding distance of the engagement member with respect to the fixing surface of the cover members. This prevents an inadvertent touch of the pressing section from resulting in release of the engagement member from the receiving member.

In accordance with the protective cover of the second aspect of the present invention, a mere release of the engagement member from the receiving member allows the other edges of the cover members to depart from each other and then stop at a desired angular position. This allows an easy handling especially upon release of the locking mechanism.

In accordance with the protective cover of the third aspect of the present invention, the protective cover can be stored in the container with a compact dimension and a stable posture of the protective cover.

What is claimed is:

1. A protective cover detachably fixed onto a spool, on which an optical fiber is wound, to protect the optical fiber in association with the spool, said protective cover comprising:

a pair of cover members each having a half-cylindrical surface and coupled together by a hinge at one edges of said half-cylindrical surfaces of both said cover members; and a locking mechanism for releasably locking together both said cover members at the other edges of said half-cylindrical surfaces of both said cover members, said locking mechanism including a receiving member fixed onto a vicinity of the other edge of said half-cylindrical surface of one of said cover members, and an engagement member fixed onto a vicinity of the other edge of said half-cylindrical surface of the other of said cover members and capable of being inserted in or released from said receiving member, wherein:

said engagement member is configured as an elastic stripe body, which has a fixed end fixed onto a fixing surface of the other of said cover members, a free end extending from said fixed end and having thereon an locking protrusion capable of being engaged with said receiving member after insertion of said free end into said receiving member, and a pressing section formed in a vicinity of said fixed end, said pressing section releasing engagement of said free end from said receiving member when said pressing section is pressed toward said fixing surface against elasticity of said elastic stripe body.

2. The protective cover according to claim 1, wherein said locking protrusion has a reduced thickness as viewed in the direction of insertion of said engagement member, and is pressed by said receiving member against elasticity of said engagement member during said insertion, which is effected by relative closing movement of both said cover members.

3. The protective cover according to claim 1, wherein said pressing section is configured by a pressing protrusion or a notch formed on said elastic stripe body.

4. The protective cover according to claim 1, wherein a maximum width between outside surfaces of both said engagement members is not more than a width of cylindrical said protective cover as viewed in an axial direction of cylindrical said protective cover.

5. A protective cover detachably fixed onto a spool, on which an optical fiber is wound, to protect the optical fiber in association with the spool, said protective cover comprising:

first and second cover members each having a half-cylindrical surface and coupled together by a hinge at one edges of said half-cylindrical surfaces of both said first and second cover members; and a locking mechanism for releasably locking together both said first and second cover members at the other edges of said half-cylindrical surfaces of both said first and second cover members, said locking mechanism including a receiving member fixed onto a fixing surface of said first cover member and an engagement member fixed onto a fixing surface of said second cover member and capable of being inserted in or released from said receiving member, wherein:

when the other edges of said first and second cover members are abut together by an external force to lock the locking mechanism, surfaces of said hinge abut each other before surfaces of said first and second cover members abut each other, and when the surfaces of said hinge abut each other, the other edges of said half-cylindrical surfaces of said first and second cover members are apart from each other at an angle of 2 to 7 degrees therebetween as measured from a center of said hinge.

6. A protective cover detachably fixed onto a spool, on which an optical fiber is wound, to protect the optical fiber in association with the spool, said protective cover comprising:

first and second cover members each having a half-cylindrical surface and coupled together by a hinge at one edges of said half-cylindrical surfaces of both said first and second cover members; and a locking mechanism for releasably locking together both said first and second cover members at said other edges of said half-cylindrical surfaces of said first and second cover members, said locking mechanism including a receiving member fixed onto a vicinity of the other edge of said half-cylindrical surface of said first cover member and an engagement member fixed onto a vicinity of the other edge of said half-cylindrical surface of said second cover member and capable of being inserted in or released from said receiving member, wherein:

each of said first and second cover members includes first and second legs in pair on said half-cylindrical surface thereof; and a first plane defined by tops of said first and second legs formed on one of said first and second cover members is perpendicular to a second plane defined by tops of said first and second legs formed on the other of said first and second cover members, after said first and second cover members are coupled together by said locking mechanism.

7. The protective cover according to claim 6, wherein, if said protective cover is received in a container having a square cross section, with said first and second cover members being locked together by said locking mechanism, and with tops of said first and second legs being in contact with inner surfaces of said container, cylindrical said protective cover are substantially in contact with said inner surfaces of said container at four side lines extending in the axial direction.

8. The protective cover according to claim 6, wherein at least one of said first and second legs has a top extending along an axial direction of cylindrical said protective cover.

9. The protective cover according to claim 6, wherein at least one of said first and second legs has at least two tops apart from each other in the axial direction of cylindrical said protective cover.

* * * * *